United States Patent [19]

Jozefowicz

[11] Patent Number: 5,180,598
[45] Date of Patent: Jan. 19, 1993

[54] LIQUID AND/OR TEMPERATURE ACTIVATED ELAPSED TIME INDICATORS SUITABLE, IN PARTICULAR, AS DONENESS INDICATORS FOR FOODSTUFFS

[75] Inventor: Mark A. Jozefowicz, Kingston, Canada

[73] Assignee: Alcan International Limited, Montreal, Canada

[21] Appl. No.: 518,022

[22] Filed: May 2, 1990

[30] Foreign Application Priority Data

Apr. 11, 1990 [CA] Canada ............................ 2014409

[51] Int. Cl.$^5$ .......................................... A23L 1/025
[52] U.S. Cl. .............................. 426/88; 219/10.55 E; 426/107; 426/243
[58] Field of Search ................... 426/88, 107, 243; 219/10.55 E; 116/216, 206; 374/161, 162, 149, 135, 138

[56] References Cited

U.S. PATENT DOCUMENTS

| | | | |
|---|---|---|---|
| 3,420,205 | 1/1969 | Morison | 116/216 |
| 3,954,011 | 6/1976 | Manske | 73/356 |
| 3,962,920 | 6/1976 | Manske | 73/356 |
| 4,195,057 | 3/1980 | Patel | 422/56 |
| 4,201,080 | 5/1980 | Slepak et al. | 73/73 |
| 4,231,370 | 11/1980 | Mroz et al. | 128/287 |
| 4,432,656 | 2/1984 | Allmendinger | 374/102 |
| 4,681,576 | 7/1987 | Colon et al. | 604/361 |
| 4,735,745 | 4/1988 | Prezios et al. | 252/408.1 |
| 4,786,773 | 11/1988 | Keefer | 219/10.55 E |
| 4,864,847 | 9/1989 | Anderson et al. | 73/40.7 |

FOREIGN PATENT DOCUMENTS 0006028  6/1979  European Pat. Off. .
0389274  3/1990  European Pat. Off. .
62-197486 9/1987 Japan .

OTHER PUBLICATIONS

Microwave World, vol. 10, No. 4, 1989 R. Herzig & M. D. Ball, pp. 5-10.

Primary Examiner—Donald E. Czaja
Assistant Examiner—Anthony Weier
Attorney, Agent, or Firm—Cooper & Dunham

[57] ABSTRACT

Liquid and/or temperature activated elaspsed time sensors suitable, in particular, for use as doneness indicators for foodstuffs and for other purposes. The liquid activated indicators include a porous structure which generates a first color by effects which include optical interference when pores of the structure are gas-filled, and a second contrasting color when the pores of the structure are liquid filled. The porous structure is covered with a transparent or translucent cover which is unattached in certain areas to allow for capillary movement of liquid between the cover and the porous structure. An entrance permits liquid to enter between the cover and the porous structure. When contacted with liqiuid, the liquid is drawn into the device and produces an expanding area of contrasting color which is used to indicate the elapse of time. In one form, the doneness indicator, when located on the outside of a food container, can be activated by water condensed from steam generated as the food is heated, preferably by microwaves. In an alternative form the activated elapsed time indicator may contain a meltable solid which provides the liquid to operate the liquid activated indicator described above at a predetermined temperature.

13 Claims, 4 Drawing Sheets

LIQUID AND/OR TEMPERATURE ACTIVATED ELAPSED TIME INDICATORS SUITABLE, IN PARTICULAR, AS DONENESS INDICATORS FOR FOODSTUFFS

BACKGROUND OF THE INVENTION

1. Field of the Invention

This invention relates to liquid and/or temperature activated elapsed time indicators capable of indicating the elapse of time from the initial contact of the indicator with a liquid and/or the initial sensing of a predetermined minimum temperature.

2. Description of Related Art

Indicators of the above kind are useful for a variety of purposes (as will be explained more fully later) but are of special interest as so-called "doneness indicators" for foodstuffs and the invention will be described primarily, or at least initially, with reference to this particular application.

Doneness indicators are devices which detect and visibly indicate the state of readiness for consumption of heated foods, particularly preprepared foods intended to be heated in the containers in which they are purchased. The popularity of domestic microwave ovens has created a considerable demand for preprepared food portions packaged in containers which can be used in microwave ovens. While such products are becoming increasingly common, there is a major drawback to their use which is giving rise to significant customer dissatisfaction. For most preprepared food products, it is difficult to provide heating instructions which, even if followed exactly, give acceptable results all, or even most, of the time. The problem arises because of the large variety of microwave ovens currently on the market having varying characteristics and power ratings, because of the uneven nature of the heating effect which occurs when foodstuffs are heated by in microwave ovens, and because of the fact that supposedly frozen foods are often partially or completely thawed out before being subjected to microwave heating and may thus be at a higher initial temperature than anticipated by the food product manufacturer when heating is commenced.

The problem is not unique to prepackaged foods intended to be heated in microwave ovens, but tends to be more acute when microwave rather than conventional heating is employed because of the very rapid nature of microwave heating. This rapidity of heating means that small timing errors can result in serious under- or over-cooking.

The concept of providing a doneness indicator in a foodstuff package has therefore been developed in order to remove the guesswork that has previously been necessary when attempting to microwave prepared food products. The underlying considerations and criteria for doneness indicators are discussed in an article by R. Herzig and M. D. Ball entitled "A Design Strategy for 'Doneness' Indicators" published in Microwave World, Vol. 10, No. 4, 1989. In this article it is explained that, in products which heat non-uniformly (which means most foodstuffs), the hottest regions (usually around the edges) often trigger conventional temperature-sensing doneness indicators long before the cooler regions have reached an acceptable temperature. Another problem is that temperature-sensing indicators incorporating materials which themselves are heated by microwaves tend to give erroneous results because they become heated directly by the microwaves rather than sensing the temperature of the food. It is therefore not an easy matter to devise a doneness indicator which will give consistent results in a wide variety of ovens and under a wide variety of conditions.

A possible solution is to provide a microwave-shielded device which not only senses temperature, but also indicates the elapse of a certain period of time following the first detection of a predetermined cooking temperature. The time period to be indicated is one which corresponds to the time it normally takes all regions of the foodstuff to be heated to a suitable temperature without some areas being overdone.

U.S. Pat. No. 3,954,011 to Manske issued on May 4, 1976 discloses a sensor which can be used to sense a predetermined temperature and to indicate the elapse of time at the predetermined temperature. Although there is no disclosure of the use of the sensor for microwave cookery nor mention of shielding, it is stated that the sensor can be used for temperature sensitive items such as foods which require cooking. The device includes a wick and a reservoir containing a solid which melts at a particular temperature. The device does not start to provide an indication of the elapse of time until the melting temperature is exceeded and then the elapse of time is indicated by the progress of the molten coloured fluid as it is drawn along the wick. One problem with this type of device, when considered for use as a microwave doneness indicator, is that the capacity of the fluid reservoir is finite and so the fluid tends to move along the wick increasingly more slowly as more fluid leaves the reservoir and is absorbed by the wick. The result is a non-linear indication of sensed time. Moreover, the absence of shielding results in a lack of indicator reliability and the progress of the fluid along the wick may not be very visible or clear.

The same or similar disadvantages are present in other conventional elapsed time indicators used for purposes other than the indication of the doneness of food.

Accordingly, a primary object of the present invention is to provide an elapsed time indicator which is capable of giving a clear and reliable indication of the elapse of time following the initial sensing of a predetermined condition.

Another object of the present invention, at least in one of its forms, is to provide a doneness indicator for a food container which overcomes at least some of the disadvantages of conventional indicators of this kind.

Another object of the invention, at least in one of its forms, is to provide a doneness indicator particularly suitable for use with microwavable food containers.

Another object of the invention, at least in one of its forms, is to provide a microwavable food package which incorporates a doneness indicator.

Another object of the invention, at least in one of its forms, is to provide a liquid activated device capable of providing a clear indication of the elapse of time following the initial sensing of the presence of a liquid.

Yet another object of the invention is to provide a temperature activated device which clearly exhibits the elapse of time the device is subject to a temperature above a predetermined minimum value.

SUMMARY OF THE INVENTION

According to one aspect of the present invention, there is provided a liquid-activated elapsed time indicator, which comprises: an open porous structure which generates a first colour by effects which include optical interference when pores of said structure are gas-filled and a second contrasting colour when pores of said structure are liquid-filled; a transparent or translucent cover overlying said porous structure and being unattached to said porous structure, in at least limited areas thereof, in a manner which causes capillary movement of liquid positioned between said porous structure and said cover in said at least limited areas; and an entrance to permit liquid to enter between said porous structure and said cover; said entrance being positioned with respect to said at least limited areas such that an area of said second contrasting colour expanding from said entrance as liquid passes therethrough can serve as an indicator of elapsed time.

According to another aspect of the present invention, there is provided a package for a foodstuff, which comprises: a container for said foodstuff having an exterior wall; an opening, or a region capable of being penetrated to form an opening, in said exterior wall and a liquid-activated elapsed time indicator to provide an indication of doneness of said foodstuff, said indicator being positioned outside said exterior wall sufficiently close to said opening or said region to be contacted by water emerging from said opening as said foodstuff is heated.

According to another aspect of the present invention, there is provided a package for a foodstuff, which comprises: a container for said foodstuff having an exterior wall with at least one transparent section and a liquid-activated elapsed time indicator to provide an indication of doneness of said foodstuff, said indicator being positioned within said exterior wall in such a manner that said indicator is visible through said at least one transparent section, said indicator also being positioned to come into contact with water condensed from said foodstuff as said foodstuff is heated.

According to another aspect of the present invention, there is provided a temperature-activated elapsed time indicator, comprising: a reservoir for a solid which melts to form a liquid at a predetermined elevated temperature, an open porous structure which generates a first colour by effects which include optical interference when pores of said structure are gas-filled and a second contrasting when pores of said structure are liquid-filled; a transparent or translucent cover overlying said porous structure and being unattached to said porous structure, in at least limited areas thereof, in a manner which causes capillary movement of said liquid when positioned between said porous structure and said cover; and an entrance communicating with said reservoir to permit said liquid to enter between said porous structure and said cover.

LIQUID ACTIVATED ELAPSED TIME INDICATORS

Figure 1:
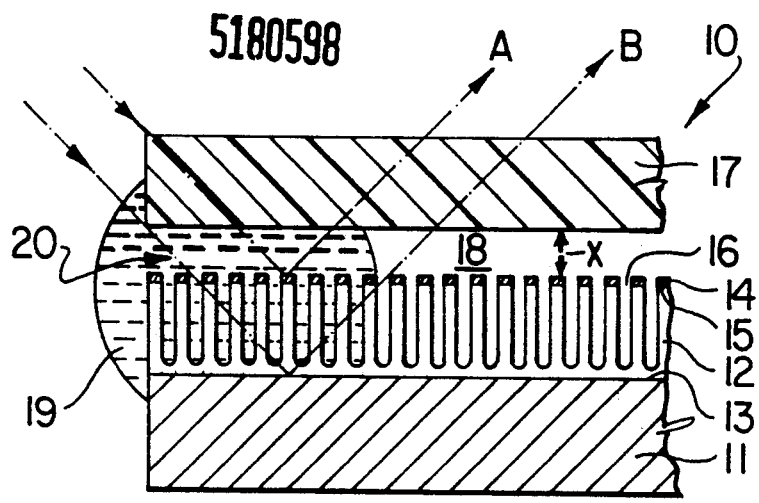
FIG. 1 is a cross-section of an elapsed time indicator according to one preferred aspect of the invention.

In one of its basic forms, the present invention relates to an elapsed time indicator which is activated in the presence of a liquid. By varying the source or the nature of the liquid, the indicator can be used to sense different conditions and/or specific temperatures and can thus be used for different applications.

The device of this basic form of the invention acts as an elapsed time indicator by providing a moving area of visible colour or colour contrast caused by the absorption of a liquid into the device by capillary action. The colour or colour contrast is brought about by the effect of the liquid on a structure which generates colour by means comprising light interference effects.

Our co-pending Canadian patent application Serial No. 589,921 filed on Feb. 2, 1989 and our Canadian patent application Serial Number 615,000 filed on Sep. 29, 1989 (the disclosures of which are incorporated herein by reference) describe optical interference structures capable of exhibiting highly visible non-dichroic or dichroic colours. These structures, in their simplest forms, comprise an optically thin porous transparent film covering a reflective (or partially reflective) metal substrate, and possibly incorporate one or more additional reflective but translucent metal layers. Reflections of light from closely spaced reflective surfaces within such structures result in the generation of a visible colour by light interference and possibly absorption effects. The transparent porous films are most conveniently formed by anodization of the metal substrate (usually made of aluminum or containing an aluminum layer) in an electrolyte containing an acid, such as phosphoric acid or sulfuric acid, which forms pores in the anodic film as it is generated. When additional metal layers are required, these can be provided in or on the porous structures by electro-deposition or vapour deposition techniques. In the case of the prior patent applications mentioned above, steps are taken to make the anodic film detachable from the metal substrate so that a colour change can be produced upon detachment of the film from the substrate metal. In the present invention, however, there is no need for such detachability of the porous film and instead use is made of the fact that displacement of air from inside the pores by a liquid causes a change in air from inside the pores by a liquid causes a change in appearance of the generated colour. This arises from the fact that the hue of the generated colour is determined not only by the spacing of the reflective surfaces within the colour-generating structure but also by the average refractive index of the transparent material separating the reflective surfaces. The introduction of a liquid into the pores of the porous film can change the average refractive index of the film sufficiently to change the observed hue.

We have now found that by covering the porous film of the above type of structure with a sheet of preferably non-absorbent transparent or translucent material to form a flexible or rigid cover, and by spacing the cover from the porous film sufficiency for capillary action, liquid contacting the structure is progressively drawn into the space between the porous film and the cover, and an area of contrasting colour is observable which expands with time as more and more of the pores in the film become filled with the liquid.

It is found that the length of time it takes for the area of contrasting colour to spread is governed theoretically by the following equation:

$$t = \frac{6 \times \eta \times h^2}{X \times \gamma \times (\cos \theta_1 + \cos \theta_2)}$$

wherein:
t = time
$\eta$ = viscosity of liquid
h = length of advance of the liquid interface
X = clearance between the cover and the porous layer
$\gamma$ = surface tension
$\theta$ = contact angle (angle at the edge of a drop of liquid placed on the porous surface.)

If the dimensions of the gap between the porous structure and the overlying cover are defined as X = height, Y = width and Z = length, the time T it takes for the capillary to completely fill with liquid will vary;
Inversely with X
Negligibly with Y
Proportionally with Z.

It has also been found that:
As the viscosity of the fluid increases, so will T
As the surface tension of the fluid increases so will T
As the surface tension of the capillary walls increase, T will decrease.

The capillary dimensions can be adjusted by varying the thickness of an adhesive used to attach the overlying transparent cover to the porous structure at the edges or by varying the length of the track along which the colour change is to take place, etc.

A basic structure according to this form of the invention is shown in cross-section in FIG. 1 of the drawings. The indicator 10 comprises a metal substrate 11 (e.g. aluminum foil) having a porous film 12 of metal oxide intimately contacting one surface 13 thereof. The film 12 has a thickness in the order of the wavelength of light (e.g. up to about 3 microns) and carries a very thin, discontinuous transparent metal layer 14 on the outer surface 15 thereof. The discontinuous metal layer 14 does not block pores 16 in the film 12 and is made so thin that it is translucent, but nevertheless provides strong reflections of light (Ray A) which interfere with light passing through the metal layer 14 and reflected from the surface 13 of the metal substrate 11 (Ray B). The resulting interference patterns impart a visible dichroic or non-dichroic colour to the structure. The structure is covered by a transparent or translucent cover sheet 17 which allows light to pass into and out of the device. The cover 17 is spaced from the film 12 by a distance x (preferably in the range of 0.1 to 200 μm), forming a gap 18, which is small enough for capillary action so that liquid is present at an edge of the structure, where there is an entrance 20 between the cover 17 and the film 12, is drawn into and progressively further along the gap 18 as time passes. As the liquid contacts the film 12, the liquid enters the pores 16 and hence changes the average refractive index of the film 12 in the areas contacted by the liquid.

Figure 2:
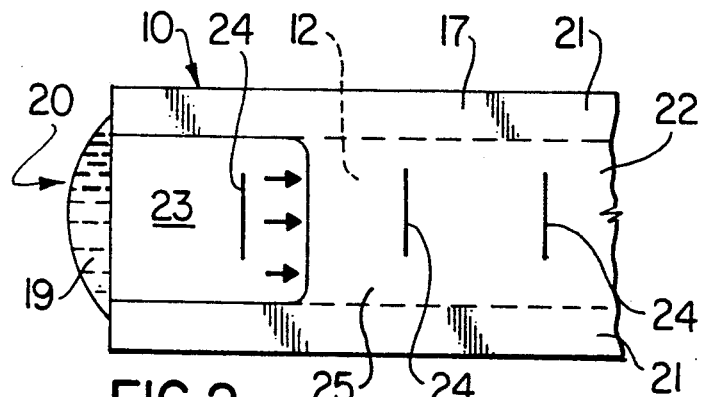
FIG. 2 is a plan view of the indicator of FIG. 1.

FIG. 2 is a plan view of the structure of FIG. 1. This view shows that the indicator 10 is preferably of elongated rectangular shape with the entrance 20 at one of the longitudinal ends of the indicator. The cover 17 is adhered to the underlying film 12 at the extreme side edges 21 of the indicator but is unattached in the central region 22 to provide the gap 18. The central region 22 thus forms an elongated track 25 to act as a visible display zone. As the liquid 19 is absorbed by the device, it produces a rectangular column of contrasting colour 23 which moves progressively along the track 25 as long as the indicator continues to be contacted by the liquid. If desired, the indicator may have marks, such as those at 24, to indicate particular time periods, or alternatively the length of the indicator may be made such that the desired elapse of time is indicated when the change of colour has progressed along the entire track 25.

The end of the indicator 10 opposite to the end provided with the entrance 20 is not shown in the drawings but may be essentially the same, i.e. there need not be any sealing of the gap 18 at this end. It may be desirable, however, to seal the gap 18 at this end in order to prevent liquid entering the indicator at this position and thus causing the indicator to change colour at both ends. The sealing of the gap does not prevent the proper operation of the device because air displaced by the liquid entering the device through the entrance 20 merely forms a bubble at the opposite end of the indicator but does not build up any appreciable back pressure to oppose the absorption of the liquid through the entrance 20.

As a further modification, it should be pointed out that the entrance 20 for the introduction of the liquid into the gap 18 need not be positioned at an edge of the device as shown and can alternatively be in the form of a hole at any convenient location in the covering sheet 17 or the substrate metal layer 11. By positioning such a hole away from sealed edges of the indicator, the area of expanding colour or colour contrast would be generally circular and would expand in all directions at approximately the same rate.

The methods of manufacturing the interference structures used for the indicator described above are explained in detail in our co-pending patent applications referred to earlier. Briefly, however, one method involves anodization of aluminum foil 11 in an electrolyte containing an acid (e.g. phosphoric acid or sulfuric acid) to produce the thin porous film 12 followed by a technique (e.g. vacuum sputtering) to deposit the thin, porous transparent or translucent metal layer 14 on the porous film. These structures are modified for use in the present invention by attaching the transparent cover 17 to the porous transparent film 12 only in the edge areas 21 in order to leave the gap 18 for the progressive intake of liquid 19 by capillary action as explained above so that the resulting structure can be used to indicate the elapse of time as well as the presence of moisture. The attachment can be by means of a glue layer or by means of heat sealing.

If desired, so-called "latent-indicia" (i.e. hidden messages, patterns or designs) can be incorporated into the indicators in various ways so that these indicia become visible when the indicator indicates a suitable elapse of time. This can be achieved, for example, either by attaching the sheet 17 to the film 12 in such a way that track 25 itself is shaped to from letters, numbers, patterns or designs, or by printing the indicia on the sheet 17 using an ink having a hue substantially identical to that generated by the interference structure. The printing remains invisible until the background areas of track 25 change to a different colour.

Indicators of the above kind intended for activation by an external source of water are particularly suitable for use as doneness indicators for microwavable food containers, as will be explained in detail below.

DONENESS INDICATORS

Certain aspects of the present invention relating to doneness indicators for foodstuffs rely on the fact that most foodstuffs generate steam when heated to cooking temperatures. When such foodstuffs are heated in closed containers, the generated steam usually condenses on the inner walls of the container, this being particularly true when the foodstuff is heated by microwaves since microwaves generate heat directly in the foodstuff and not in the walls of the microwave-transparent container, so the walls tend to remain cooler than they would in a conventional oven. The condensed steam can be used to activate a liquid-activated elapsed time indicator, e.g. of the above kind. While this can be done by positioning the elapsed time indicator inside the food container, e.g. attached to the underside of the lid, and either making the container transparent or providing a transparent window which allows the indicator to be seen from the outside as cooking progresses, this sometimes gives rise to disadvantages. Not only is the resulting doneness indicator often difficult to see, but the doneness indicator may be activated prematurely by condensation forming inside the container prior to the cooking operation, e.g. when undergoing freezing and thawing cycles.

In a particularly preferred aspect of this form of the invention, this disadvantage is eliminated by positioning the doneness indicator on the outside of the food container close to a small hole in the container wall. Steam exiting the container through the hole as cooking commences forces out some of the condensed water collecting on the inside of the container wall and the water forced out in this way extends over an appreciable area of the exterior of the container wall around the hole. The amount of water available in this area is substantial, even if the hole is located in a sloping or vertical surface of the container, and is continuously replenished from within the container. The water from this source can thus be used to activate a liquid-activatable elapsed time indicator acting as a doneness indicator and provides an inexhaustible reservoir of activating liquid throughout the intended cooking period. This means that the doneness indicator can provide a linear indication of elapsed time without the disadvantage of positioning the indicator inside the food container. The indicator is set into operation by the first of the condensed steam which exits the container through the small hole. When the indicator shows an elapse of a predetermined time period from this initial starting point, the user is assured that heating has taken place for sufficient time to allow the remaining areas of the foodstuff to be raised to a suitable temperature without overcooking.

It is preferable to position the doneness indicator on the container in a region where the microwave field is at a minimum so that there is little tendency for the water in the region of the hole or inside the doneness indicator to become heated and evaporated by the direct effect of the microwaves. The choice of a suitable position for the doneness indicator is particularly simple if the container is of the type disclosed in our prior Canadian patent No. 1,228,126, issued on Oct. 13, 1987 or the equivalent U.S. Pat. No. 4,656,325, issued on Apr. 7, 1987 (the disclosures of which are incorporated herein by reference), which incorporates areas of metal foil in the lid of the container. If the doneness indicator is positioned on one of these foil areas, the electromagnetic field around the doneness indicator will be practially zero. However, suitable positions can be found for other types of containers, and anyway, some amount of evaporation of the activating water is acceptable because of the continuous replenishment which takes place from the condensate within the container.

Figure 3:
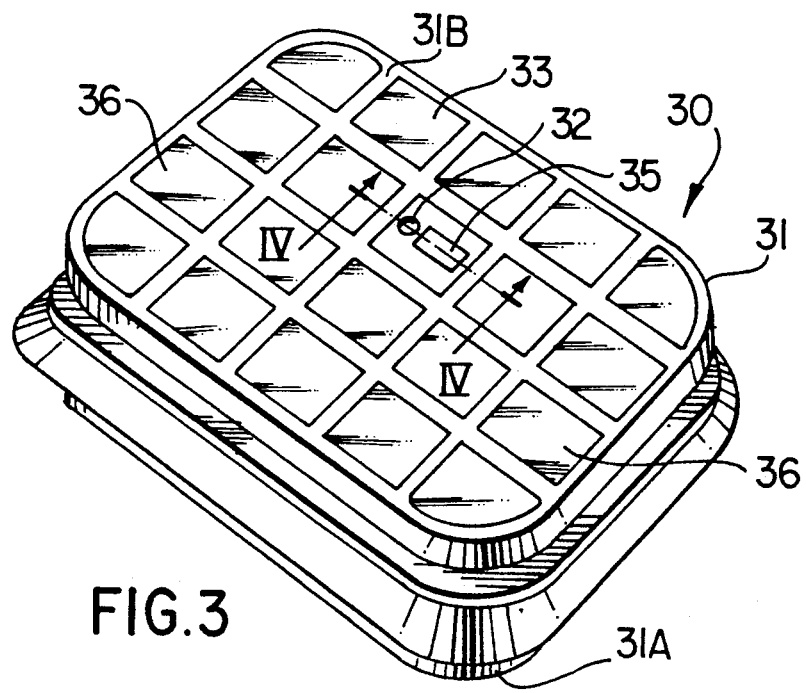
FIG. 3 is a perspective view of a package for a foodstuff according to a preferred embodiment of the present invention.
Figure 4:
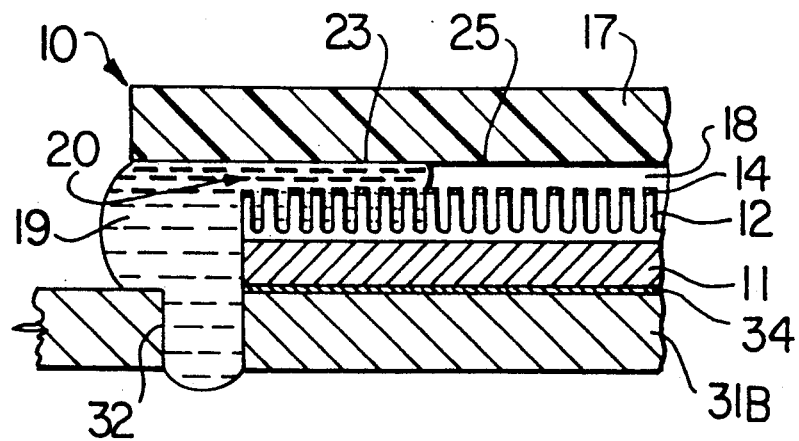
FIG. 4 is a partial cross-section on an enlarged scale of the package of FIG. 3 taken along the line IV—IV.

While it should be kept in mind that this aspect of the invention is not limited to the use of elapsed time indicators of the interference type described above, the use of such indicators is particularly preferred. One embodiment of a food package 30 comprising a food container and a doneness indicator of the interference type is shown in FIGS. 3 and 4. The embodiment comprises a closed container 31 made of microwave permeable material for a foodstuff (not shown), such as a pre-cooked frozen dinner entree. The container 31 has a lower part 31A and an upper part 31B which fit together to enclose the foodstuff in the conventional way. The upper part 31B of the container is provided with foil rectangles 36 in the flat upper surface 33 according to our prior patent mentioned above. The upper part 31B has a hole 32 in one of the foil rectangles at a point where leakage of the contents of the container is not likely to take place. Prior to cooking of the foodstuff, the hole may, if desired, be covered with a removable closure (not shown), such as a strip of adhesive plastic tape, aluminum foil, or the like, to prevent leakage or contamination of the foodstuff during shipping and handling. Alternatively, a weakened region may be provided, if necessary, so that a hole 32 in the container can be punched in the correct place by the user prior to heating.

The package 30 includes a liquid activated doneness indicator 35, e.g. an elapsed time indicator 10 as shown in FIGS. 1 and 2, positioned close to hole 32. The doneness indicator 35 may also be protected from moisture prior to use by means of removable adhesive tape or the like in order to avoid premature activation of the indicator.

As shown in FIG. 4, when the indicator of FIGS. 1 and 2 is used for this purpose, the transparent or translucent cover 17 is preferably extended beyond the anodic film 12 above the entrance 20 so as to overhang the hole 32 in the upper container wall 31B. This helps to ensure that water 19 exiting the opening 32 remains in the region of the entrance 20 to the indicator in order to assure the formation and retention of a renewable liquid reservoir as the food in the container initially reaches the cooking temperature. The indicator 10 then operates in the manner indicated earlier with the expanding area 23 of contrasting colour indicating the elapse of time from the first appearance of the condensate.

By making the indicator 10 of a suitable length so that cooking is complete after all of the track 25 has undergone a colour change, or by providing a marker 24 at a point along the path to indicate when cooking is complete (see FIG. 2), the structure can be used to indicate an optimum cooking time for the foodstuff in the container 31. Different cooking times required for different foodstuffs and/or containers can be accommodated by providing indicators of different lengths or having markers at different positions. It is also found that, by varying parameters such as the location of the indicator with respect to the hole, the dimensions of the air gap 18, etc., a time delay of 5 seconds to 20 minutes can be achieved with a one inch long indicator. This range equates to the standard microwave cooking times.

The indicator 10 can be attached to the container by means of an adhesive layer 34 as shown, or alternatively, the indicator can be formed integrally with the container by anodizing a small area of one of the foil rectangles 36 to form the required porous anodic film, which is then covered with the transparent or translucent cover in the manner previously indicated.

The use of the preferred interference type liquid-activated elapsed time indicator (of the kind shown in FIGS. 1 and 2), as the doneness indicator is advantageous not only because it is capable of providing a very precise, attractive and highly visible indication of elapsed time (and hence of doneness), but also because the metal substrate layer 11 provides a degree of shielding against the microwave radiation which protects the liquid in the device from direct heating by the microwaves. Accordingly, the device is less subject to inaccuracies than conventional devices which make use of non-metallic wicks and the like.

While it is preferred to use an interference type liquid activated elapsed time indicator of the type shown in FIGS. 1 and 2 in the assembly of FIG. 3, other types of such indicators may also be employed while still enjoying the advantages of the inventive concept of using liquid from within the container to activate an elapsed time indicator positioned on the outside of the container. For example, the doneness indicator 35 may be in the form of an arrangement including a wick having means to make the progress of the moisture along the wick visible to an observer. In one such an embodiment, a concentrated pigment is positioned at one end of the wick which is first exposed to the moisture. When a liquid comes into contact with the end of the wick, the colour is carried down the wick by the diffusion of the liquid. Proper cooking of the food is indicated when the coloration reaches a certain point from the end of the wick or when complete coloration of the wick has taken place.

In a second embodiment having an alternative type of indicator, a wick is provided having a dried substance at one end which, when wetted, is either of low or high pH. At the other end of the wick, a dried pH sensitive substance is provided which changes colour upon encountering a change of pH. Liquid filtration along the wick eventually causes the two substances to come into contact, thus causing a visible colour change and indicating that the foodstuff has been cooking for a suitable time.

In both of the above alternative embodiments of the container/doneness indicator assembly, the end of the wick intended to take in the moisture is positioned sufficiently close to the hole to receive condensate from within the container.

The liquid activated interference type elapsed time indicator of the general kind shown in FIGS. 1 and 2 of the drawings can be used, if desired, as a doneness indicator positioned inside a food container. While this does not avoid the disadvantage previously mentioned that premature activation may take place as a result of moisture generated during freeze/thaw cycles, this disadvantage may be acceptable in some cases, e.g. when such cycles are not likely to be encountered. When used in this way, the device is positioned within a transparent container or beneath a window in an otherwise opaque container.

Figure 5:
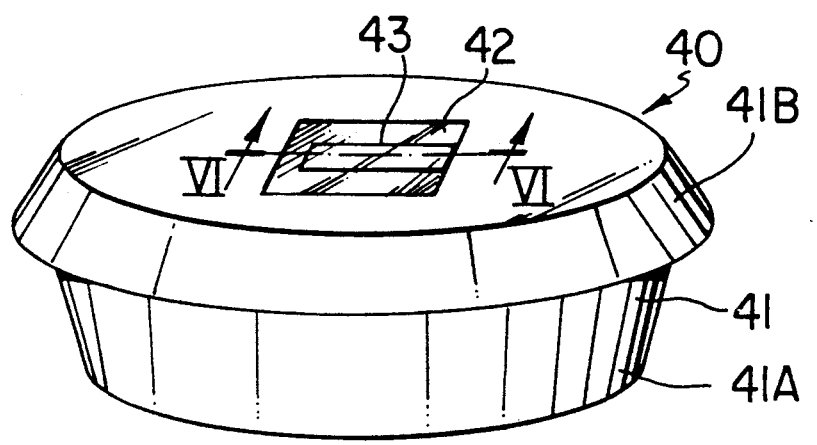
FIG. 5 is a perspective view of a food package according to another embodiment of the invention.
Figure 6:
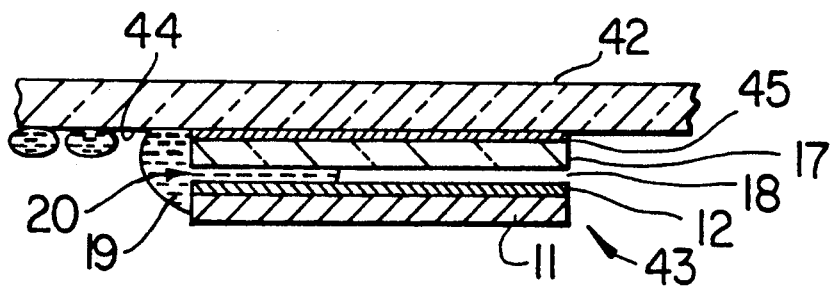
FIG. 6 is a cross-section on the indicated line of the package of FIG. 5 showing a first arrangement of an elapsed time indicator.
Figure 7:
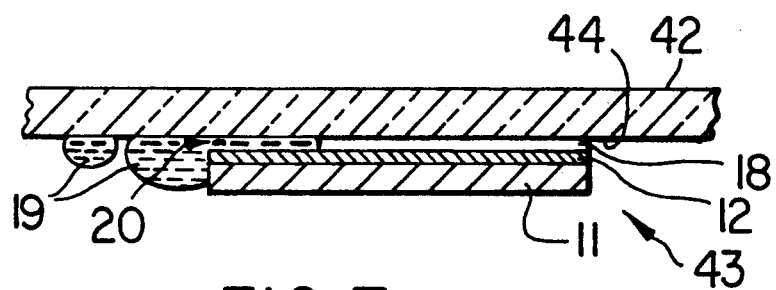
FIG. 7 is a cross-section on the indicated line of the package of FIG. 5 showing a second arrangement of an elapsed time indicator.

Suitable arrangements of this kind are shown in FIGS. 5, 6 and 7. FIG. 5 is a perspective view of a food package 40 comprising a container 41 having a base 41A and a lid 41B. The lid 41B has a central transparent window 42 but is otherwise opaque. An interference type elapsed time indicator 43 positioned inside the container is visible through the window 42.

FIG. 6 is a cross-section showing a first arrangement of the elapsed time indicator 43. The device is essentially the same as the indicator of FIGS. 1 and 2 and merely has the transparent cover 17 adhered by means of a transparent adhesive 45 to the underside 44 of the window 42. Water 19 condensed on the underside 44 of the window when the cooking of the food commences enters the opening 20 of the device and the resulting change of colour is visible through the window 42.

FIG. 7 is a cross-section showing a second arrangement of the elapsed time indicator 43. In this case, there is no separate transparent cover 17, but the transparent window 42 itself provides the same function. The porous film 12 is adhered directly to the underside 44 of the window in such a way that the necessary gap 18 is provided in order to form a track for the change of colour as water is drawn into the device by capillary action.

OTHER USES

The interference type elapsed time indicators of the present invention of the general kind shown in FIGS. 1 and 2 of the drawings are suitable for use in any application in which an indication of time following the availability of a liquid (which need not necessarily be water) is required. One example of such an additional application is a device to warn of premature thawing of frozen foods. When transporting and displaying frozen foods, premature thawing is to be avoided to prevent bacterial contamination of the food and spoilage of texture and appearance. However, minor amounts of thawing can often be tolerated if only the extreme outer surfaces of the foodstuff are involved. By positioning an indicator of the type shown in FIGS. 1 and 2 within a transparent package of the foodstuff following freezing of the foodstuff, the indicator will remain unchanged as long as the package remains frozen. When thawing commences, however, water becomes available and starts to penetrate the device. If freezing again takes place, the water in the device solidifies and cannot move further along the track 25. A marker can be provided to indicate when thawing has taken place for long enough to cause a risk of food spoilage. Repeated freezing and thawing cycles will also eventually cause the visibly changed part of the indicator to reach the mark and thus to indicate that the product is unacceptable.

TEMPERATURE ACTIVATED ELAPSED TIME INDICATORS

The interference type indicators of the present invention can also be used as temperature-activated elapsed time indicators by employing a meltable solid as the means to activate the colour change. By making use of a solid, e.g. a wax, which melts at a predetermined temperature, and positioning the solid in such a way that the liquid it produces when it melts collects around the entrance 20, the activation of the elapsed time indicator commences only when a temperature exceeding the melting point of the solid is encountered. This operation is equivalent to the use of the indicator as a freeze/thaw indicator, except that virtually any temperature can be sensed by choosing a meltable solid with a suitable melting point. Moreover, the indicator can be made self-contained by enclosing the meltable solid in an enclosure acting as a reservoir surrounding and communicating with the entrance 20. Such an enclosure may be, for example, a thin transparent or non-transparent plastic bubble surrounding a wax pellet or similar meltable solid. If desired, this kind of device can be used as a doneness indicator for positioning either outside a food container or inside a transparent container or one having a window in the lid.

Figure 8:
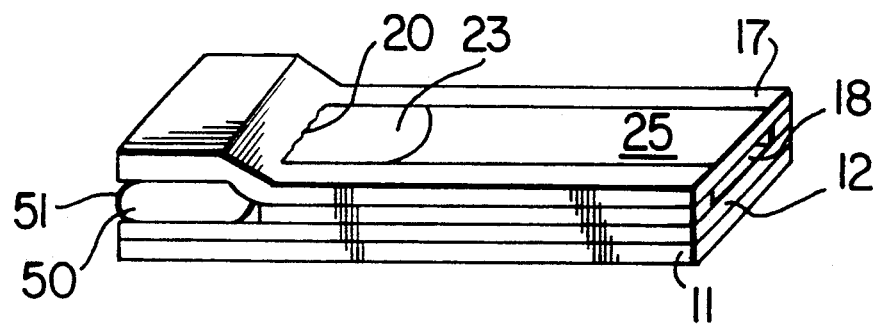
FIG. 8 is a perspective view of a first preferred temperature-activated elapsed time indicator.
Figure 9:
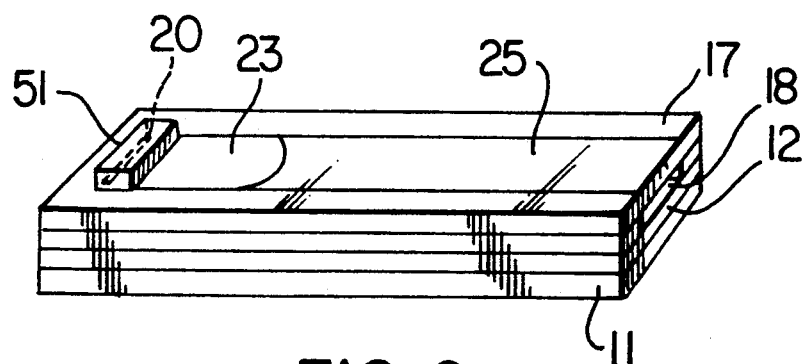
FIG. 9 is a perspective view of a second preferred temperature-activated elapsed time indicator.

Two alternative embodiments of temperature activated elapsed time indicators of the above kind are shown in FIGS. 8 and 9. These devices are largely the same as the devices of FIGS. 1 and 2 except in the region of the entrance 20. In the device of FIG. 8, the gap 18 is enlarged in a region extending from the entrance 20 to form a reservoir 50 containing a pellet 51 of wax or other meltable solid. The reservoir 50 may be sealed at the side edges by a layer of adhesive or by a U-shaped wall element (not shown) to contain the liquid produced when the wax pellet melts. Alternatively, in some cases the wax pellet need not be contained at the side edges, since a liquid of high surface tension is unlikely to flow out of the device.

In the embodiment of FIG. 9, there is no reservoir of the type shown in FIG. 8 and the entrance 20 is positioned in the transparent cover 17, the device being sealed by layers of adhesive at the side along its full length edges. A wax pellet 51 is positioned and preferably secured on the transparent cover 17 above the entrance 20 so that liquid produced when the wax melts is drawn into the entrance 20 by capillary action.

In both embodiments, the melted wax produces an area of contrasting colour 23 which progresses along the track 25 as time elapses provided the temperature of the device remains above the melting point of the wax.

The invention is illustrated further by the following non-limiting Examples.

EXAMPLE 1

A 1 inch long indicator of the type shown in FIGS. 1 and 2 was attached to the outside of the lid of a microwavable container enclosing a frozen 280 gram macaroni and cheese dinner near a hole in the lid.

The container was heated in a domestic 570 watt microwave oven set at high. After approximately 2½ minutes the indicator activated and it took about 2 minutes for the colour change to move down the indicator strip.

The result was reproducible and the effect was obvious to the user looking through the oven door screen.

The food was warmed through to the centre.

EXAMPLE 2

Figure 10:
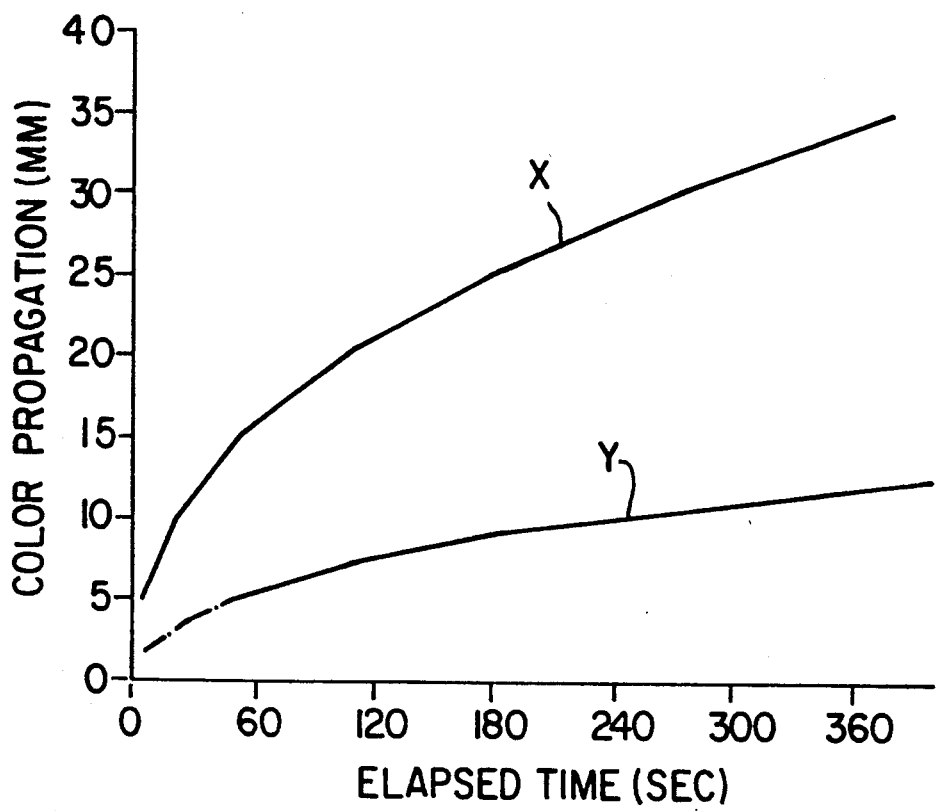
FIG. 10 is a graph of elapsed time versus colour propagation as explained in the Examples.

A metal-oxide-metal structure of the type shown in FIGS. 1 and 2 was prepared by anodizing an aluminum/polyester laminate for 1 minute at 15 volts d-c in 1M $H_3PO_4$ at 30° C. The panel was subsequently immersed in dilute acidified stannous chloride, then dilute acidified palladium(ous) chloride, then a commercial electroless nickel bath. Each immersion lasted approximately 15 seconds and water rinses followed. The panel was then reanodized for a period of 3 minutes under the same conditions except a-c replaced the previous d-c potential. Upon rinsing and drying, stripes were printed on the panel with a UV curable laminating adhesive each separated by 3 mm. The thickness of the adhesive gap was varied. 1 mil polyester was then laminated to the surface and the adhesive was subsequently cured under UV light. Water was brought into contact with the open-ended edge of each column and the rate at which colour change propagated down the stripe was measured. The results are graphically illustrated in FIG. 10 in which the solid line X represents the results for a 2.0 micron gap width and the chain line Y represents the results for a gap width of 0.2 microns.

EXAMPLE 3

In this Example the wicking material employed was an open ended column consisting of an opague deliquescent material, e.g. pulverized sucrose, sandwiched between a coloured substrate and a transparent plastic top coat. This indicator was then adhered to the lid of a microwavable food container so that the open end of the column lined up with a hole previously punched in the lid.

As condensate from the underside of the lid formed, it traveled into the open column dissolving away the sucrose and by doing so, caused the colour of the column to change from white to the colour of the substrate. This colour change then traveled down the length of the wick with the diffusing condensate. The wick could either be time calibrated with small marks or precalibrated to a set distance.

EXAMPLE 4

In this Example an entire strip of wicking material, e.g. white blotting paper, was impregnated with a moisture sensitive colour change material, e.g. anhydrous calcium sulfate. In another completely separate operation, foil was punched with a small hole. The wick was positioned onto the top side of the foil so that one end of the wick rested directly over the hole. The wick was then laminated to the foil with a transparent plastic top coat. This indicator was then adhered to the lid of a microwavable food container so that the hole in the underside of the indicator (not visible from above) lined up with a hole previously punched in the lid.

As condensate from the underside of the lid began to saturate the wick, the moisture sensitive material hydrated causing a colour change (in this case from blue to pink). This colour change then traveled down the length of the wick with the diffusing condensate. Once again the wick could either be time calibrated with small marks or precalibrated to a set distance.

EXAMPLE 5

In this Example one end of a strip of wicking material, e.g. white blotting paper, was impregnated with a water soluble dye, e.g. methylene blue. In another completely separate operation, foil was punched with a small hole. The wick was positioned onto the top side of the foil so that the impregnated area of the wick lay directly over the hole. The wick was then laminated to the foil with a transparent plastic top coat. This indicator was then adhered to the lid of a microwavable food container so that the hole in the underside of the indicator (not visible from above) lined up with a hole previously punched in the lid.

As condensate began to saturate the wick, it dissolved the dye and carried it, via diffusion, down the length changing the colour of the wick from white to blue as it did so. The wick could either be time calibrated with small marks or precalibrated to a set distance.

EXAMPLE 6

In this Example an entire strip of wicking material, e.g. white blotting paper, was impregnated with a pH sensitive colour change material, e.g. congo red. A small section of the same wick was dusted with a dry water soluble acid e.g. tartaric acid. In another completely separate operation, foil was punched with a small hole. The wick was positioned onto the top side of the foil so that the acid dusted area lay directly over the hole. The wick was then laminated to the foil with a transparent plastic top coat. This indicator was then adhered to the lid of a microwavable food container so that the hole in the underside of the indicator (not visible from above) lined up with a hole previously punched in the lid.

As condensate from the underside of the lid began to saturate the wick, it dissolved the acid causing a lowering of pH. This pH change caused the congo red dye to change to blue. Thus as the acidified condensate diffused down the length of the wick, the colour of the wick changed from red to blue. As in the previous Example the wick could either be time calibrated with small marks or precalibrated to a set distance.

While preferred embodiments of the present invention have been described in detail above, it will be apparent to persons skilled in the art that various modifications can be made without changing the nature of the invention. All such modifications are included with the scope of the following claims.

What we claim is:

1. A liquid-activated elapsed time indicator, which comprises:
    structure, having open pores to permit entry, retention, and egress of fluids, which structure comprises an optically thin porous transparent film covering an at least partially reflective metal substrate and which generates a first color by optical interference effects when pores of said structure are gas-filled and a second contrasting color when pores of said structure are liquid-filled;
    a transparent or translucent cover overlying said porous transparent film and adhered adjacent to lateral edges of said structures but remaining, at least in limited areas thereof, unattached to said structure and spaced therefrom by a distance which results in capillary movement of liquid positioned between said structure and said cover in said at least limited areas; and
    an entrance to permit liquid to enter between said structure and said cover;
    said entrance being positioned with respect to said at least limited areas such that an area of said second contrasting color expanding from said entrance as liquid passes therethrough can serve as an indicator of elapsed time.

2. An indicator according to claim 1 wherein said optically thin porous film is an anodic film formed by anodizing said metal substrate.

3. An indicator according to claim 2 wherein said porous anodic film has an outer surface and wherein said outer surface of said porous anodic film has a transparent or translucent discontinuous layer of metal thereon.

4. An indicator according to claim 1, wherein said entrance is open to an exterior of said indicator to permit liquid from said exterior to enter said indicator.

5. An indicator according to claim 1, wherein said entrance communicates with a reservoir containing a solid which melts to form a liquid at a predetermined elevated temperature.

6. An indicator according to claim 1, wherein said structure and said cover are generally flat and terminate at side edges of the indicator and wherein said entrance is positioned in one of said side edges.

7. An indicator according to claim 6 wherein said at least limited areas form an elongated generally rectangular track extending from said entrance.

8. An indicator according to claim 1, wherein said cover is spaced from said structure by a distance in the range of 0.1 to 200 $\mu$m.

9. A package for a water-containing foodstuff, which comprises:
    a container for said foodstuff having an exterior wall;
    an opening, or a region capable of being penetrated to form an opening, in said exterior wall, and
    a liquid-activated elapsed time indicator to provide an indication of doneness of said foodstuff upon heating of said package, said indicator being positioned outside said exterior wall sufficiently close to said opening or said region to be contacted by water emerging from said opening as said foodstuff is heated;
    said indicator comprising:
    a structure, having open pores to permit entry, retention and egress of fluids, which structure comprises an optically thin porous transparent film covering an at least partially reflective metal substrate and which generates a first color by optical interference effects when pores of said structure are gas-filled and a second contrasting color when pores of said structure are liquid-filled;
    a transparent or translucent cover overlying said porous transparent film and adhered adjacent to lateral edges of said structure but remaining, at least in limited areas thereof, unattached to said structure and spaced therefrom by a distance which results in capillary movement of liquid positioned between said structure and said cover in said at least limited areas; and
    an entrance to permit liquid to enter between said structure and said cover;
    said entrance being positioned with respect to said at least limited areas such that an area of said second contrasting color expanding from said entrance as liquid passes therethrough can serve as an indicator of elapsed time.

10. A package according to claim 9 wherein at least a part of said exterior wall is permeable to microwave radiation.

11. A package according to claim 9 wherein at least a part of said exterior wall is permeable to microwaves but has at least one area of metal to cause a localized reduction of electromagnetic field around said area of metal when said package is subjected to microwave radiation, and wherein said liquid-activated elapsed time indicator is positioned on said area of metal.

12. A package for a foodstuff, which comprises:

a container for said foodstuff having an exterior wall with at least one transparent section, and a liquid-activated elapsed time indicator to provide an indication of doneness of said foodstuff, said indicator being attached to an inner surface of said exterior wall in such a manner that said indicator is visible through said at least one transparent section, said indicator also being positioned to come into contact with water condensed from said foodstuff as said foodstuff is heated and said indicator comprising:

a structure, having open pores to permit entry, retention, and egress of fluids, which structure comprises an optically thin porous transparent film covering an at least partially reflective metal substrate and which generates a first color by optical interference effects when pores of said structure are gas-filled and a second contrasting color when pores of said structure are liquid-filled;

a transparent or translucent cover overlying said porous transparent film and adhered adjacent to lateral edges of said structure but remaining, at least in limited areas thereof, unattached to said structure and spaced therefrom by a distance which results in capillary movement of liquid positioned between said structure and said cover in said at least limited areas; and an entrance to permit liquid to enter between said structure and said cover in said at least limited areas; said entrance being positioned with respect to said at least limited areas such that an area of said second contrasting color expanding from said entrance as liquid passes therethrough can serve as an indicator of elapsed time.

13. A temperature-activated elapsed time indicator, comprising:

a reservoir for a solid which melts to form a liquid at a predetermined elevated temperature, a structure, having open pores to permit entry, retention, and egress of fluids, which structure comprises an optically thin porous transparent film covering an at least partially reflective metal substrate and which generates a first color by optical interference effects when pores of said structure are gas-filled and a second contrasting color when pores of said structure are liquid-filled;

a transparent or translucent cover overlying said porous transparent film and adhered adjacent to lateral edges of said structure but remaining, at least in limited areas thereof, unattached to said porous structure and spaced therefrom by a distance which results in capillary movement of liquid positioned between said structure and said cover in said at least limited areas; and an entrance to permit liquid to enter between said structure and said cover in said at least limited areas; said entrance being positioned with respect to said at least limited areas such that an area of said second contrasting color expanding from said entrance as liquid passes therethrough can serve as an indicator of elapsed time;

said entrance communicating with said reservoir to permit said liquid from said reservoir to enter between said structure and said cover.

* * * * *